United States Patent [19]

Schuhmacher et al.

[11] Patent Number: 5,942,030
[45] Date of Patent: Aug. 24, 1999

[54] PIGMENT PREPARATION

[75] Inventors: Peter Schuhmacher, Mannheim; Karl Siemensmeyer, Frankenthal; Juan Antonio González Gómez, Ludwigshafen; Norbert Schneider, Altrip, all of Germany

[73] Assignee: BASF Aktiengesellschaft, Ludwigshafen, Germany

[21] Appl. No.: 09/117,143

[22] PCT Filed: Jan. 22, 1997

[86] PCT No.: PCT/EP97/00278

§ 371 Date: Jul. 24, 1998

§ 102(e) Date: Jul. 24, 1998

[87] PCT Pub. No.: WO97/27252

PCT Pub. Date: Jul. 31, 1997

[30] Foreign Application Priority Data

Jan. 26, 1996 [DE] Germany .......................... 196 02 848

[51] Int. Cl.⁶ .......................... C09B 67/42; C09B 67/02; C09K 19/00; C09K 19/52
[52] U.S. Cl. .......................... 106/493; 106/498; 106/499; 106/506
[58] Field of Search .......................... 106/493, 498, 106/499, 506

[56] References Cited

U.S. PATENT DOCUMENTS 5,362,315  11/1994  Muller-Rees et al. .................. 106/493
5,683,622  11/1997  Kratzschmar et al. ............ 252/299.01

FOREIGN PATENT DOCUMENTS

| | | |
|---|---|---|
| 0 724 005 | 7/1996 | European Pat. Off. . |
| 0 727 472 | 8/1996 | European Pat. Off. . |
| 43 42 280 A1 | 11/1993 | Germany . |
| 42 40 743 | 6/1994 | Germany . |
| 195 32 408 A1 | 1/1995 | Germany . |
| 44 18 076 | 11/1995 | Germany . |
| WO 95 29962 | 11/1995 | WIPO . |
| WO 95 32247 | 11/1995 | WIPO . |
| WO 96 02597 | 2/1996 | WIPO . |

*Primary Examiner*—Anthony Green
*Attorney, Agent, or Firm*—Oblon, Spivak, McClelland, Maier & Neustadt, P.C.

[57] ABSTRACT

Process for preparing pigments by applying a polymerizable mixture to a surface, orienting the liquid crystals present in the mixture, polymerizing the mixture, detaching the polymer film from the surface and comminuting the polymer film to form pigment particles, wherein the polymerizable mixture comprises:

$a_1$) at least one chiral liquid-crystalline polymerizable monomer or $a_2$) at least one achiral liquid-crystalline polymerizable monomer and a chiral compound, and additionally b) a polymeric binder and/or monomeric compounds which are converted by polymerization into a polymeric binder and/or a dispersion auxiliary.

17 Claims, No Drawings

PIGMENT PREPARATION

The present invention relates to a process for preparing pigments by applying a polymerizable mixture to a surface, orienting the liquid crystals present in the mixture, polymerizing the mixture, detaching the polymer film from the surface and comminuting the polymer film to form pigment particles, wherein the polymerizable mixture comprises:

$a_1$) at least one chiral liquid-crystalline polymerizable monomer or $a_2$) at least one achiral liquid-crystalline polymerizable monomer and a chiral compound, and additionally b) a polymeric binder and/or monomeric compounds which are converted by polymerization into a polymeric binder and/or a dispersion auxiliary.

The present invention additionally relates to pigments obtainable by this process, to coating compositions comprising these pigments, to the use of the pigments in emulsion paints and other surface coatings, to the use of the coating compositions comprising the pigments for coating commodity articles, especially vehicles, and to vehicles coated with these coating compositions.

Pigments having a cholesteric liquid-crystalline structure are of interest as special-effect pigments whose perceived color depends on the viewing angle. The perceived color arises through interference effects in a helical superstructure which is an essential feature of the cholesteric liquid-crystalline phase.

Pigments whose color depends on the viewing angle, which consist of oriented three-dimensionally crosslinked substances of liquid-crystalline structure with a chiral phase, and if desired of further dyes and pigments, are known from EP-B1-0 601 483. However, the brightness of color of these pigments is not fully satisfactory.

Prior German Patent Application 19 532 419.6 describes a process for the surface coating of substrates, in which the coating composition comprises liquid-crystalline polymerizable monomers, with or without chiral compounds which induce a cholesteric structure, and, in addition, a polymeric binder and/or monomeric compounds which can be converted into the polymeric binder by polymerization, or a dispersion auxiliary. These polymeric binders and dispersion auxiliaries facilitate the orientation of the liquid-crystalline compounds and enable spontaneous orientation to form the cholesteric liquid-crystalline phase merely by means of the coating operation.

It is an object of the present invention to discover a process for preparing pigments whose color depends on the viewing angle and which are particularly bright in color.

We have found that this object is achieved by the pigment preparation process described at the outset.

The novel process starts from a polymerizable mixture. Polymerizable in this context means that the monomers present in the mixture can be converted into polymers by various upbuilding reactions, for example chain addition polymerization, stepwise addition polymerization or condensation polymerization.

The polymerizable mixture is first of all applied to a surface, preferably a film or a rotatable roller. It is preferably applied in a thin coat with a thickness of between 1 and 100 $\mu$. This coat thickness defines the maximum thickness of the pigments in the subsequent grinding process and also facilitates the grinding of the coat into plateletlike pigments. These plateletlike pigments are able to arrange themselves uniformly in thin coating films to give a uniform perceived color.

Liquid crystals with twisted cholesteric phases develop their optical properties only when the individual molecules are aligned in a helical superstructure. The formation of this superstructure occurs to some extent spontaneously, while in some cases the orientation has to be induced by the action of external forces.

Following application, therefore, the liquid-crystalline compounds are oriented in the coat. This is achieved most simply by means of the shear forces which act during application. However, orientation can also be effected by other known methods, such as knife coating, alignment layers or, for some liquid-crystalline systems, by means of electrical or magnetic fields.

Following orientation, the ordered liquid-crystalline state obtained is fixed by polymerization. Particularly favorable forms of polymerization in this context are those induced by light or electron beams, since they can be carried out regardless of temperature. Indeed, the temperature is a not unimportant parameter for the helical pitch of the liquid crystal and thus for the color of the interference effect and should therefore advantageously, as a color design parameter, not be restricted by the polymerization conditions.

Following polymerization, the hardened liquid-crystal coat is detached from the surface and comminuted by known methods until the desired pigment particle size is reached.

In the novel process the polymerizable mixture comprises not only liquid-crystalline monomeric compounds, with or without chiral dopants, but also a polymeric binder and/or monomeric compounds which can be converted into a polymeric binder by polymerization, and/or a dispersion auxiliary. Even in small amounts these substances increase the flow viscosity of the liquid-crystal phase and substantially facilitate the orientation of the liquid-crystal molecules. Because of the facilitated orientation, complex orientation methods become unnecessary and orientation occurs usually spontaneously by means of the coating operation. In addition, a more uniform orientation is achieved, which is manifested in increased brightness of color of the coats and of the pigments.

Examples of suitable polymeric binders are soluble (in organic solvents) polyesters, cellulose esters, polyurethanes, silicones and polyether- or polyester-modified silicones. Particular preference is given to the use of cellulose esters such as cellulose acetobutyrate. Even small amounts of such substances—usually just 0.1 to 1% by weight—bring about a considerable improvement in the flow viscosity. At the same time, these substances have a great influence on the mechanical properties of the hardened pigment particles.

Other particularly suitable polymeric binders are those comprising reactive crosslinkable groups, such as acrylic, methacrylic, $\alpha$-chloroacrylic, vinyl, vinyl ether, epoxide, cyanate, isocyanate or isothiocyanate groups. Monomeric substances are also suitable as binders, especially the reactive diluents known from paint preparation such as, for example, hexanediol diacrylate or bis-phenol A diacrylate.

Dispersion auxiliaries as well have a positive effect on the flow viscosity of the polymerizable mixture, on the miscibility of the individual components and on the orientation of the liquid crystals. As dispersion auxiliaries it is possible to employ all commercially available substances.

Particularly suitable dispersion auxiliaries are those based on a succinimide, succinate or succinic anhydride structure, as described in prior German Patent Application 19 532 419.6.

Among these dispersion auxiliaries, particular preference is given to the derivatives of polyisobutylenesuccinic acid.

As the cholesteric liquid-crystalline component the polymerizable mixture can comprise either a₁) at least one chiral liquid-crystalline polymerizable monomer or a₂) at least one achiral liquid-crystalline polymerizable monomer and a chiral compound.

As component a₁) the polymerizable mixture preferably comprises monomers of the general formula I $$[Z^1-Y^1-A^1-Y^2-M^1-Y^3-]_n X \qquad \mathrm{I}$$

where
$Z^1$ is a polymerizable group or a radical which carries a polymerizable group,
$Y^1, Y^2, Y^3$ are chemical bonds, oxygen, sulfur, —CO—O—, —O—CO—, —O—CO—O—, —CO—N(R)— or —N(R)—CO—,
$A^1$ is a spacer,
$M^1$ is a mesogenic group,
X is an n-valent chiral radical,
R is hydrogen or $C_1$-$C_4$-alkyl, and
n is 1 to 6,
it being possible for the radicals $Z^1, Y^1, Y^2, Y^3, A^1$ and $M^1$ to be identical or different.

Preferred radicals $Z^1$ are:

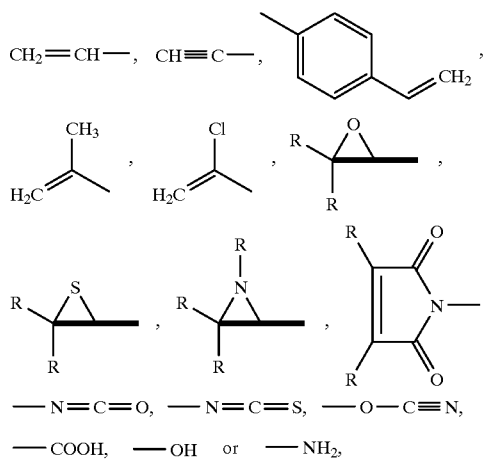

in which R is identical or different at each occurrence and is hydrogen or $C_1$-$C_4$-alkyl, eg. methyl, ethyl, n-propyl, isopropyl, n-butyl, isobutyl, sec-butyl or tert-butyl. Among the reactive polymerizable groups, the cyanates are able to trimerize spontaneously to form cyanurates and are therefore mentioned with preference. The other groups mentioned require further compounds with complementary reactive groups for polymerization. For example, isocyanates can polymerize with alcohols to form urethanes and with amines to form urea derivatives. Similar comments apply to thiiranes and aziridines. Carboxyl groups can be condensed to form polyesters and polyamides. The maleimido group is particularly suitable for free-radical copolymerization with olefinic compounds such as styrene. In this context, the complementary reactive groups can be present either in a second compound according to the invention, which is mixed with the first, or can be incorporated into the polymeric network by auxiliary compounds comprising two or more such complementary groups.

Particularly preferred groups $Z^1$-$Y^1$ are acrylate and methacrylate.

$Y^1$-$Y^3$ can be as defined above, the term chemical bond being intended to denote a single covalent bond.

Suitable spacers $A^1$ are all groups known for this purpose. The spacers generally contain 2 to 30 carbon atoms, preferably 2 to 12 carbon atoms, and consist of linear aliphatic groups. Their chain can be interrupted, for example, by O, S, NH or NCH₃, but these groups cannot be adjacent. Suitable substituents for the spacer chain are fluorine, chlorine, bromine, cyano, methyl and ethyl.

Examples of representative spacers are:

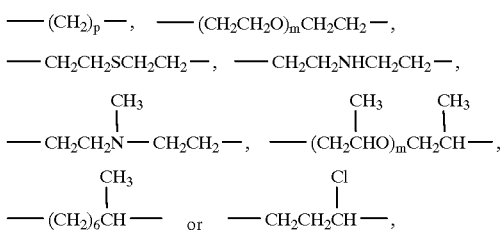

where
m is 1 to 3 and
p is 1 to 12.

The mesogenic group $M^1$ preferably has the structure $$(T-Y^8)_s-T$$

where $Y^8$ is a bridge member conforming to one of the definitions of $Y^1$, s is 1 to 3 and each T, independently at each occurrence, is a divalent isocycloaliphatic, heterocycloaliphatic, isoaromatic or heteroaromatic radical.

T can also be a ring system substituted by fluorine, chlorine, bromine, cyano, hydroxyl or nitro; preferred radicals T are:

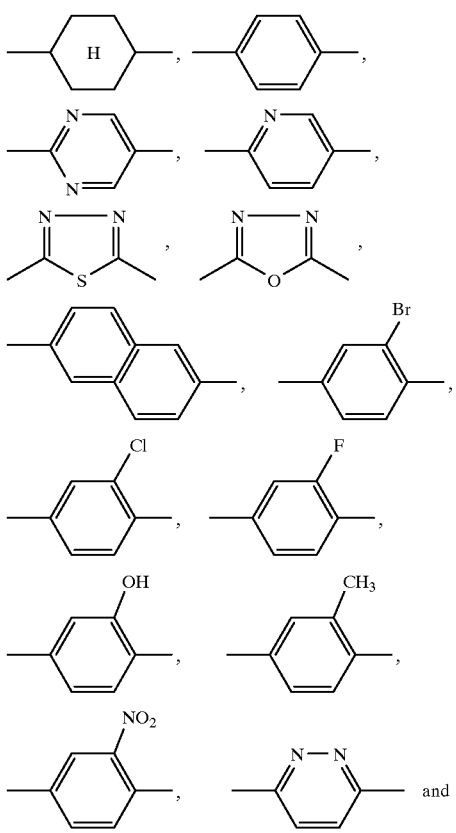

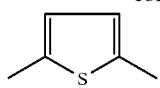

The following mesogenic groups $M^1$ are particularly preferred:

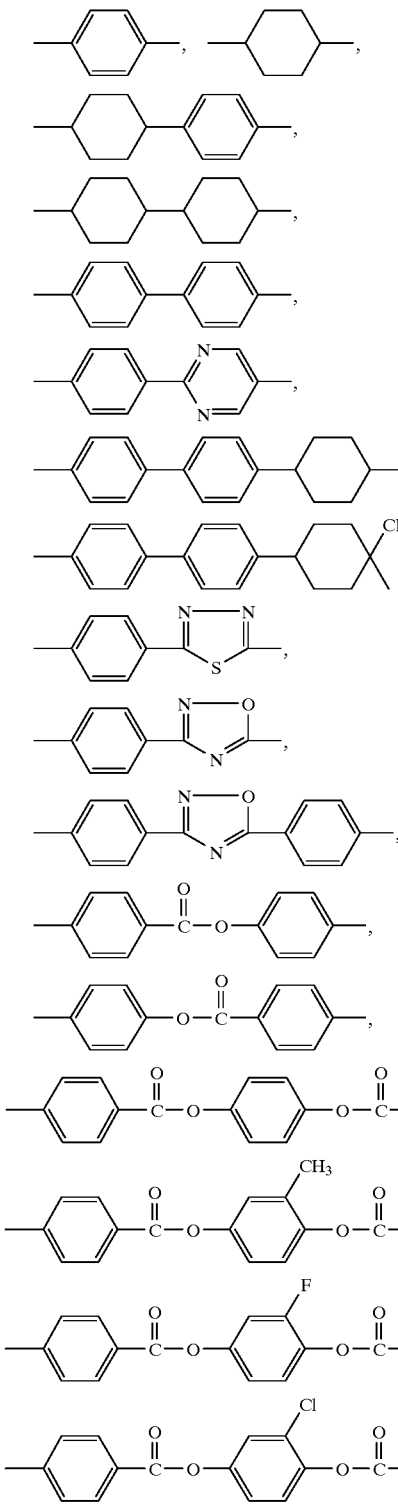

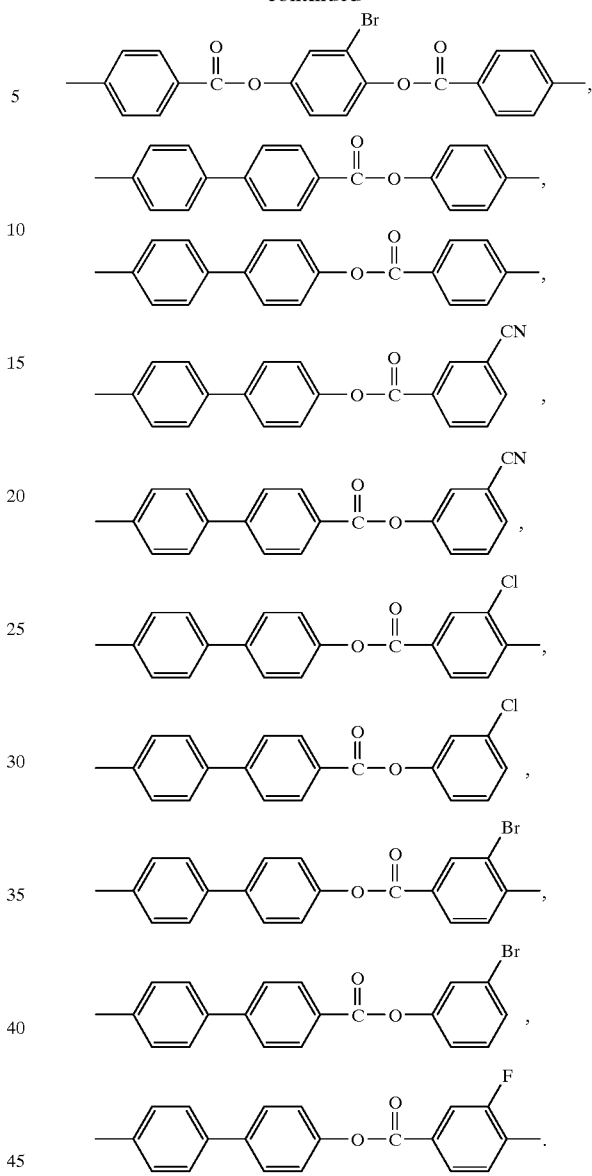

For reasons including that of availability, particularly preferred chiral radicals X of the compounds of the general formula I are those derived from sugars, from binaphthyl or biphenyl derivatives and from optically active glycols, dialcohols or amino acids. Notable sugars are, in particular, pentoses and hexoses and their derivatives.

Examples of radicals X are the following structures, the lines at the end in each case denoting the free valences.

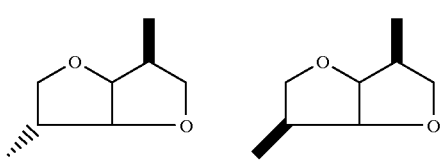

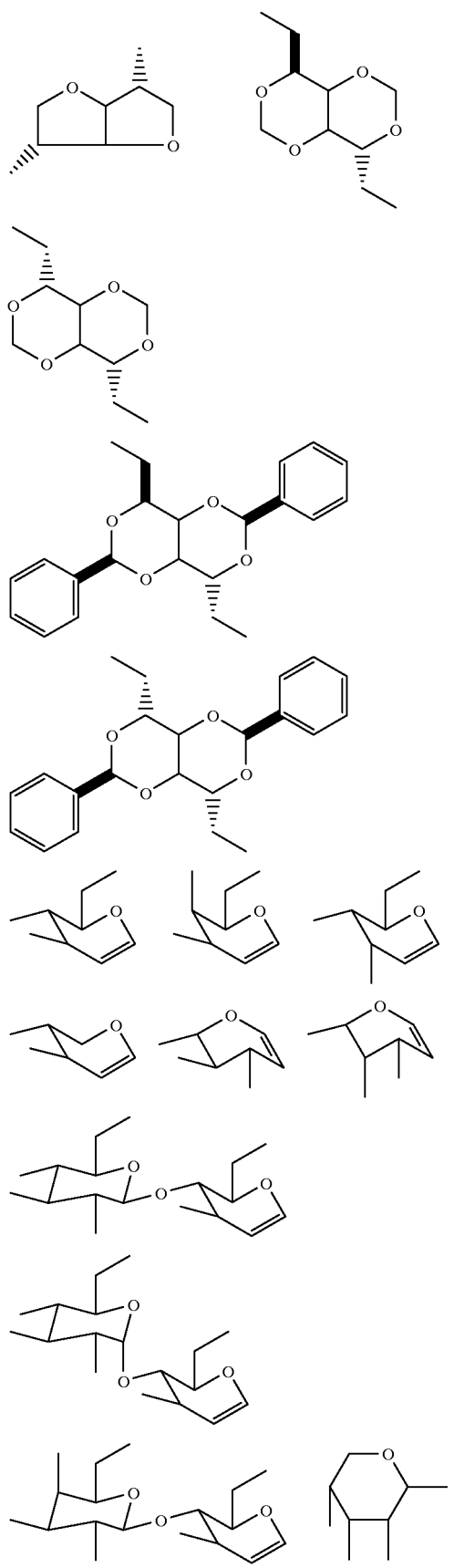
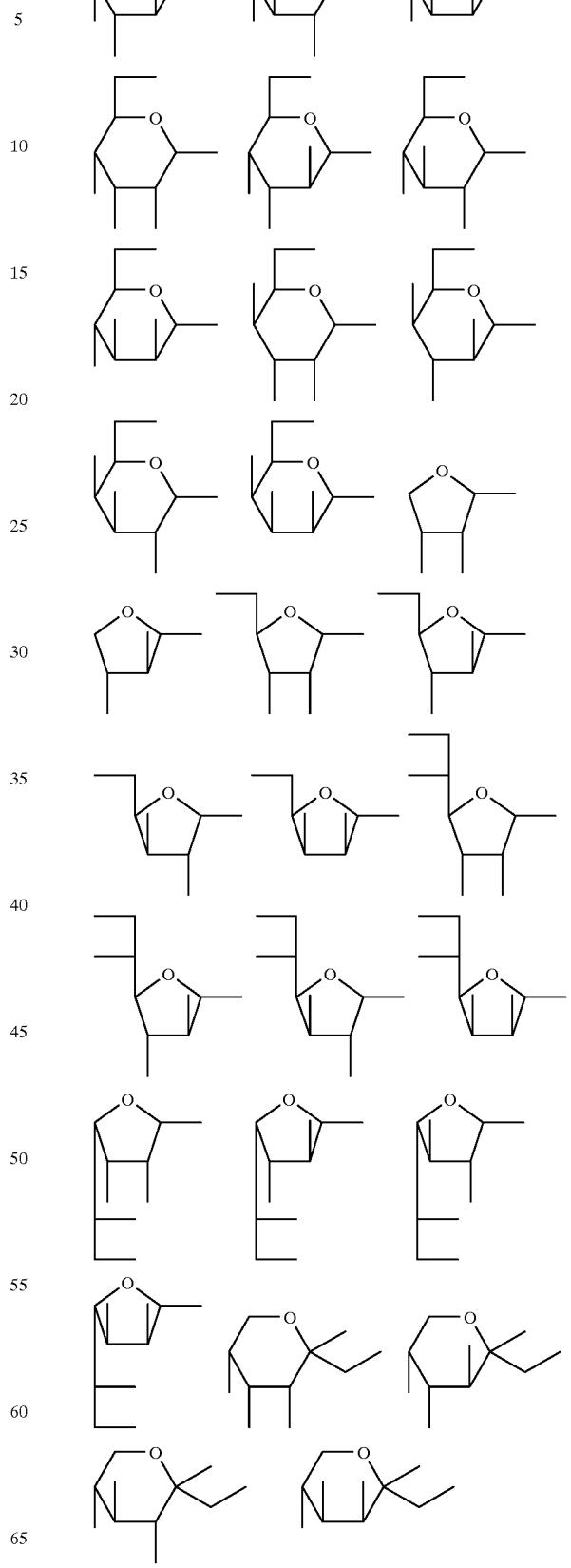

-continued

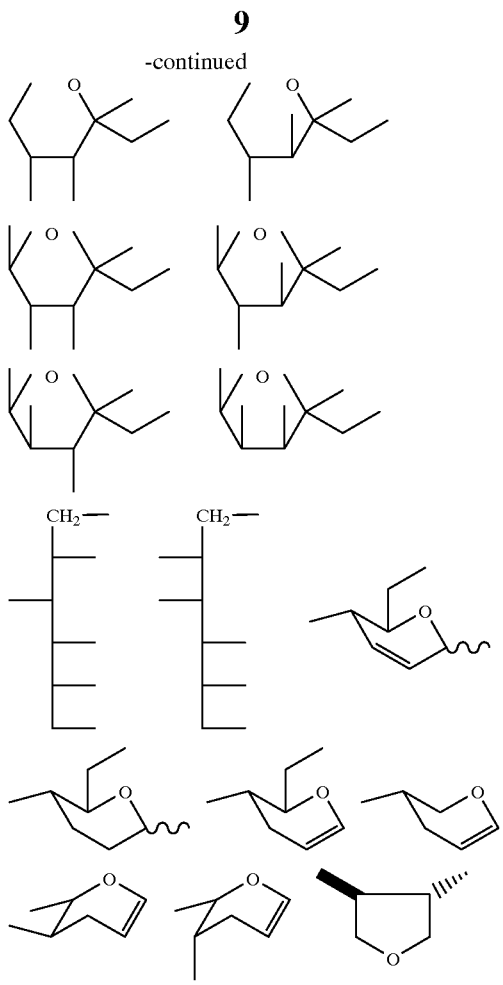

Particular preference is given to

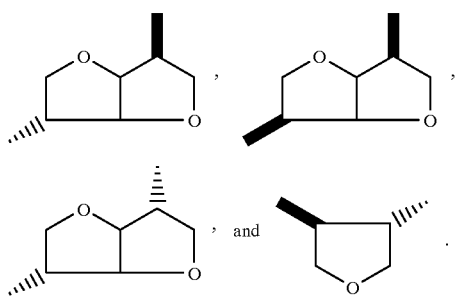

Also suitable are chiral groups having the following structures:

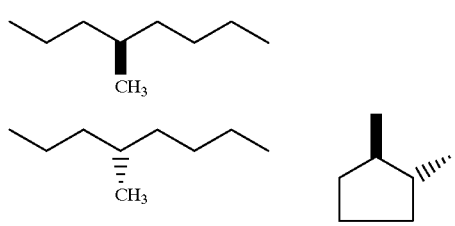

-continued

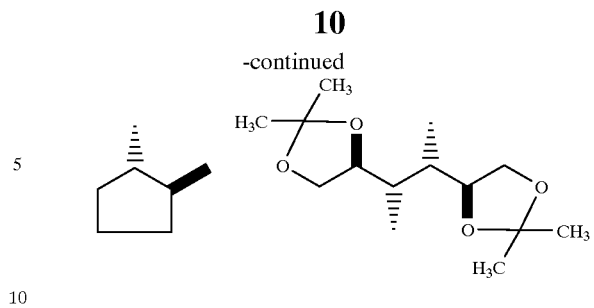

Further examples are given in German Application P 43 42 280.2.

n is preferably 2.

As component $a_2$) the polymerizable mixture in the novel process preferably comprises at least one achiral liquid-crystalline polymerizable monomer of the general formula II $$Z^2\text{-}Y^4\text{-}A^2\text{-}Y^5\text{-}M^2\text{-}Y^6\text{-}A^3\text{-}Y^7\text{-}Z^3 \qquad \text{II}$$

where $Z^2$ and $Z^3$ are polymerizable groups or radicals containing a polymerizable group, $Y^4$, $Y^5$, $Y^6$, $Y^7$ are chemical bonds, oxygen, sulfur, —CO—O—, —O—CO —, —O—CO—O—, —CO—N (R)— or —N(R)—CO—, $A^2$ and $A^3$ are spacers, and $M^2$ is a mesogenic group.

In this context, the polymerizable groups, the bridge members $Y^4$ to $Y^7$, the spacers and the mesogenic group are subject to the same preferences as the corresponding variables in the general formula I.

Component $a_2$) additionally comprises a chiral compound. The chiral compound brings about the twisting of the achiral liquid-crystalline phase to form a cholesteric phase. In this context, the extent of twisting depends on the twisting capacity of the chiral dopant and on its concentration. Consequently, therefore, the pitch of the helix and, in turn, the interference color are also dependent on the concentration of the chiral dopant. As a result, it is not possible to state a generally valid concentration range for the dopant. The dopant is added in the amount which produces the desired color effect.

Preferred chiral compounds are those of the formula Ia $$[Z^1\text{-}Y^1\text{-}A^1\text{-}Y^2\text{-}M^a\text{-}Y^3\text{-}]_n X \qquad \text{Ia,}$$

where $Z^1$, $Y^1$, $Y^2$, $Y^3$, $A^1$, X and n are as defined above and $M^a$ is a divalent radical containing at least one heterocyclic or isocyclic ring system.

In this formula the molecular subunit $M^a$ resembles the mesogenic groups described, since in this way particularly good compatibility with the liquid-crystalline compound is achieved. However, $M^a$ need not actually be mesogenic, since the compound Ia is intended to bring about an appropriate twisting of the liquid-crystalline phase solely by means of its chiral structure. Preferred ring systems present in $M^a$ are the abovementioned structures T, and preferred structures $M^a$ are those of the above formula $(T\text{-}Y^8)_s\text{-}T$.

The pigments prepared in accordance with the invention have particular properties in respect of their brightness of color. The epithet novel is therefore considered to apply to all those pigments as are obtainable by the process described.

A further advantage of the novel pigments is their relatively narrow size distribution. Application of the polymerizable mixtures to a surface produces highly uniform coats, which is manifested subsequently in a narrower range of scatter of the thickness of the ground pigment particles. In surface coating compositions, these pigments exhibit better orientation and a smoother surface.

The novel pigments can be incorporated into various coating compositions, which comprise one or more novel pigments, one or more customary paint binders, if desired, further pigments or dyes, if desired, one or more crosslinkers, and if desired, customary paint additives and/or fillers.

Examples of customary paint binders which can be present in the coating compositions are polyesters, alkyd resins, polyurethanes, (meth)acrylic copolymers and cellulose ester-based resins. These binders may be dispersed or dissolved in organic solvents.

Further pigments which can be present are any desired organic and/or inorganic pigments as are customarily employed in coating materials. Examples of such pigments are titanium dioxide, iron oxide, carbon black, azo pigments, phthalocyanine pigments, perylene pigments, quinacridone pigments or pyrrolopyrrole pigments.

Other suitable plateletlike special-effect pigments are the customary metal pigments, for example those of aluminum or copper, and the metal oxide-coated metallic pigments, other special-effect pigments, for example pearl luster (pearlescent) and interference pigments, for example coated mica, metal oxide-coated aluminum, nitrotitanium dioxide and graphite effect pigments, plateletlike (micaceous) iron oxide, molybdenum disulfide pigments, plateletlike copper phthalocyanine pigments, bismuth oxychloride platelets and coated glass flakes. The mixed oxide-coated aluminum and mica pigments can be coated with organic pigments.

Crosslinked or noncrosslinked polymer microparticles customary in paints can also be present in the coating composition.

Fillers which may be present are all those which are customary in the formulation of paints. Preference is given to silica, barium sulfate and talc.

Dyes which can be present in the coating composition are all those which are customary in the formulation of paints. Preferred dyes are those having one of the interference colors.

Examples of crosslinkers which can be present in the coating composition are formaldehyde condensation resins, such as phenol-formaldehyde and amine-formaldehyde condensation resins or polyisocyanates. The reactive diluents already mentioned above can also be added as crosslinkers.

As customary paint additives the coating compositions may comprise all additives familiar to the person skilled in the art, such as highly disperse silica, phyllosilicates, polymeric urea compounds, cellulose ethers such as hydroxyethylcellulose, methylcellulose, carboxymethylcellulose, polyvinyl alcohol, poly(meth) acrylates and poly(meth)acrylamides, polyvinylpyrrolidone and other hydrophilic and hydrophobic polymers and copolymers, flow aids, light stabilizers, antifoams, wetting agents and adhesion promoters.

Other suitable customary paint additives are polymerization initiators and polymerization catalysts.

The coating compositions can also comprise one or more organic solvents. Examples of suitable solvents are mono- or polyhydric alcohols such as propanol, butanol and hexanol, glycol ethers and glycol esters, such as diethylene glycol dialkyl ethers, glycols, such as ethylene glycol or propylene glycol, ketones, such as methyl ethyl ketone or acetone, esters, such as ethyl acetate and butyl acetate, and aromatic and aliphatic hydrocarbons.

Preferred coating compositions are those comprising water as diluent. In these aqueous coating compositions there are water-compatible binders and additives as are familiar to the person skilled in the art. For instance, water-soluble binders having anionic or cationic groups are used for these coating compositions.

Preference is given to anionically stabilized binders based on polyesters, (meth)acrylic copolymers or, with particular preference, polyurethanes.

Particular preference is given to the use of the novel pigments as a constituent of two-coat systems of the basecoat-clearcoat type, as have become established for effect finishes.

Basecoat/clearcoat systems are prepared by first of all applying a pigmented basecoat, preferably a dark-pigmented basecoat, and then overcoating the basecoat, preferably by a wet-on-wet method, i.e. after a short flash-off time without a baking step, for example at 20–80° C., with a customary clearcoat in a dry-film thickness of 30–80 $\mu$m, and then drying or crosslinking basecoat and clearcoat together at 20–140° C.

The drying conditions for the topcoat layer (basecoat and clearcoat) depend on the clearcoat system used. OEM (production-line) finishing generally employs more than 80° C. for two-component clearcoats, preferably more than 120° C. for one-component clearcoats. Refinishes produced with polyisocyanate-based two-component clearcoats are cured at room temperature or at no more than 80° C.

Suitable clearcoats are all customary clearcoats or transparent-pigmented clearcoats or tinted clearcoats.

Those which are particularly suitable are conventional/ solvent-containing one- or two-component high-solids coatings, water-dilutable clearcoats or transparent powder coatings.

The novel pigments are preferably used in inks, including printing inks, and in emulsion paints and other surface coatings.

The novel coating compositions are particularly suitable for coating, especially painting, substrates. Substrates which can be used include metallic, paper, wood or plastics substrates. They are frequently precoated or preprinted.

Customary forms of precoating for metallic substrates are zinc phosphatization, electrodeposition coating and, if desired, one or more sprayed coats, for example a primer-surfacer coat or else a solid-color (strait-shade) basecoat or topcoat.

These coats are in general fully cured. Dark pigmented coats are preferred. Plastics substrates can be provided with a plastics primer, preferably a dark plastics primer.

The novel coating compositions are particularly suitable for coating or painting commodity articles. The color effects on jewelry, packaging material, bottles, domestic articles and, in particular, on vehicles such as bicycles, motorbikes, and especially motor cars, have appeared to be of particular interest.

EXAMPLE 1

Preparation of cholesteric liquid-crystalline pigments comprising cellulose acetobutyrate A polymerizable mixture was prepared from 7.9% by weight of each of the following liquid-crystalline monomers:

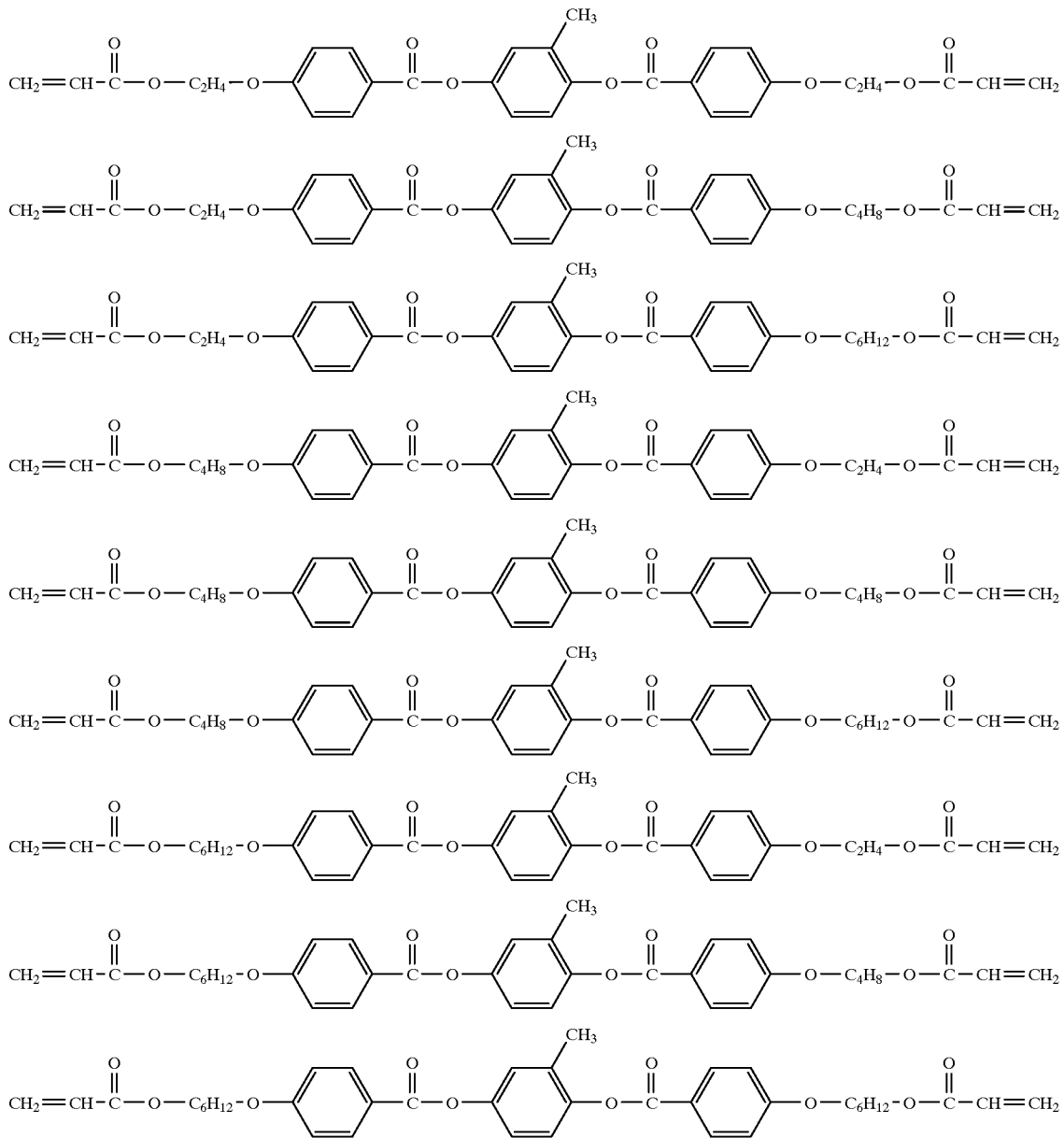
(The preparation of the monomers is described in prior German Patent Application 19 532 408.0),
4.5% by weight of the following chiral dopant

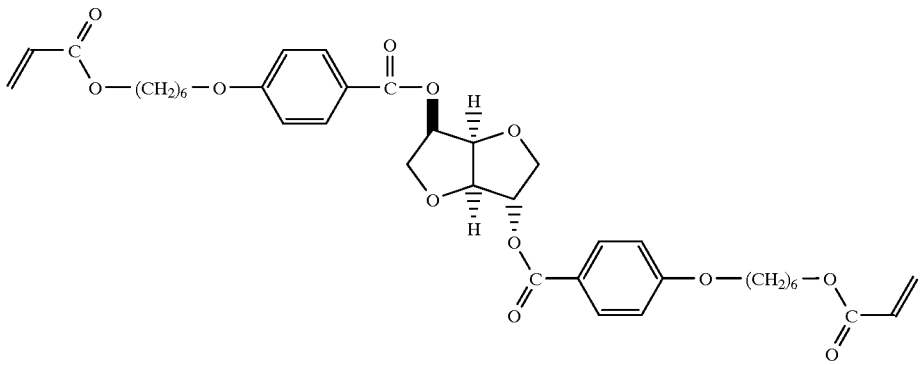

(The preparation of the dopant is described in prior German Patent Application P 43 42 280.2), 1.9% by weight of a commercial polymerization initiator (Lucirin® TPO, manufacturer BASF, Ludwigshafen),
    0.6% by weight of cellulose acetobutyrate, and
    19.9% by weight of tetrahydrofuran.

(The percentages by weight relate to the overall quantity of the polymerizable mixture.)

The mixture was applied to a glass substrate using a spiral doctor blade (coat thickness 4 μm). After evaporation of the solvent, the mixture was polymerized using UV light (wavelength 360 nm, 160 W/cm). The cured coat was detached mechanically from the substrate and ground in an analytical mill (model A10, IKA) and the ground material was separated by means of a sieve set. The resulting pigment particles had a maximum diameter of about 80 μm and a thickness of from 4 to 6 μm.

EXAMPLE 2

Comparison example: Preparation of cholesteric liquid-crystalline pigments without cellulose acetobutyrate.

Pigments were prepared by the method of Example 1 without cellulose acetobutyrate. The resulting pigment particles have a maximum diameter of 80 μm and a wider scatter of the thickness, from about 4 to 50 μm.

EXAMPLE 3

Preparation of the novel coating compositions

10% by weight of the pigments described in Example 1 were formulated with 90% by weight of a commercial nonpigmented basecoat based on saturated polyesters, cellulose derivative and amino resins to form a homogeneous mixture.

This mixture was adjusted to a spray viscosity of 18 seconds DIN4 with a mixture of 50% by volume of butyl acetate and 50% by volume of xylene. The solids content of the basecoat was 20% by weight.

The paint had a bright color with a reflection wavelength of 530 nm and a strongly pronounced color flop. The surface was homogeneous.

EXAMPLE 4

Comparison example: Coating composition with pigments from Example 2.

A coating film was prepared as in Example 3 from the pigments of Comparison Example 2. The perceived color of the coat was less bright, and its surface was rather rough.

EXAMPLE 5

Preparation of a multicoat finish of the basecoat/clearcoat type a) Clearcoats used The OEM clearcoat used was the commercial stoving enamel (FF92-0130, BASF L+F AG) based on acrylic resin, amino resin.

The refinish clearcoat used was a commercial two-component high-solids Glassodur clearcoat (923-54) with two-component high-solids Glassodur hardener (929-71) and diluent (352-91) from BASF L+F AG.

b) Preparation of the two-coat finish

The coating composition prepared in Example 3 was applied to a conventionally zinc phosphatized, electrocoated and sprayed primer-pretreated metal panel, using a compressed-air atomizing spray gun, so as to give an overall dry-film thickness of 15 to 30 μm. Application took place at an ambient temperature of 23° C. and at 60% relative atmospheric humidity.

After applying the basecoat, it was flashed off at ambient temperature for 30 minutes and then overcoated with the abovedescribed clearcoats.

Stoving was carried out at 130° C. for 30 minutes for the one-component OEM clearcoat and at 80° C. for 20 minutes for the two-component refinish clearcoat.

We claim:

1. A process for preparing pigments comprising applying a polymerizable mixture to a surface, orienting liquid crystals present in the mixture, polymerizing the mixture, detaching a polymer film formed from the mixture from the surface and comminuting the polymer film to form pigment particles, wherein the polymerizable mixture comprises:
    $a_1$) at least one chiral liquid-crystalline polymerizable monomer or
    $a_2$) at least one achiral liquid-crystalline polymerizable monomer and a chiral compound, and additionally
    b) (1) a polymeric binder and/or (2) monomeric compounds which can be converted by polymerization into a polymeric binder and/or (3) a dispersion auxiliary.

2. A process as claimed in claim 1, wherein a polymeric binder is employed as component b).

3. The process as claimed in claim 2, wherein the polymeric binder employed is cellulose acetobutyrate.

4. The process as claimed in claim 1, wherein a dispersion auxiliary is employed as component b).

5. A process as claimed in claim 4, wherein the dispersion auxiliary employed is a polyisobutylene succinic acid derivative.

6. A process as claimed in claim 1, wherein component $a_1$) comprises at least one chiral liquid-crystalline polymerizable monomer of the general formula I $$[Z^1\text{-}Y^1\text{-}A^1\text{-}Y^2\text{-}M^1\text{-}Y^3\text{-}]_n X \qquad \text{I}$$

where

Z$^1$ is a polymerizable group or a radical which carries a polymerizable group, Y$^1$, Y$^2$, Y$^3$ are chemical bonds, oxygen, sulfur, —CO—O—, —O—CO—, —O—CO—O—, —CO—N(R)— or —N(R)—CO—, A$^1$ is a spacer, M$^1$ is a mesogenic group, X is an n-valent chiral radical, R is hydrogen or C$_1$–C$_4$-alkyl, and n is 1 to 6, it being possible for the radicals Z$^1$, Y$^1$, Y$^2$, Y$^3$, A$^1$ and M$^1$ to be identical or different.

7. A process as claimed in claim 1, wherein component a$_2$) comprises at least one achiral liquid-crystalline polymerizable monomer of the general formula II $$Z^2\text{-}Y^4\text{-}A^2\text{-}Y^5\text{-}M^2\text{-}Y^6\text{-}A^3\text{-}Y^7\text{-}Z^3 \qquad \text{II}$$

where

Z$^2$ and Z$^3$ are polymerizable groups or radicals containing a polymerizable group, Y$^4$, Y$^5$, Y$^6$, Y$^7$ are chemical bonds, oxygen, sulfur, —CO—O—, —O—CO—, —O—CO—O—, —CO—N(R)— or —N(R)—CO—, A$^2$ and A$^3$ are spacers, and M$^2$ is a mesogenic group.

8. A process as claimed in claim 1, wherein component a$_2$) comprises a chiral compound of the general formula Ia $$[Z^1\text{-}Y^1\text{-}A^1\text{-}Y^2\text{-}M^a\text{-}Y^3\text{-}]_n X \qquad \text{Ia}$$

where

Z$^1$ is a polymerizable group or a radical which carries a polymerizable group, Y$^1$, Y$^2$, Y$^3$ are chemical bonds, oxygen, sulfur, —CO—O—, —O—CO—, —O—CO—O—, —CO—N(R)— or —N(R)—CO—, R is hydrogen or C$_1$–C$_4$ alkyl, A$^1$ is a spacer, X is an n-valent chiral radical, n is 1 to 6, and M$^a$ is a divalent radical containing at least one heterocyclic or isocyclic ring system, and wherein Z$^1$, Y$^2$, Y$^2$, Y$^3$, A$^1$, and M$^a$ are the same or different.

9. A pigment obtained by the process as claimed in claim 1.

10. A coating composition comprising one or more pigments as claimed in claim 9, one or more customary paint binders, optionally, further pigments or dyes, optionally, one or more crosslinkers, and optionally, customary paint additives and/or fillers.

11. A coating composition as claimed in claim 10, comprising as customary paint binders those based on polyesters, alkyd resins, polyurethanes, (meth)acrylic copolymers and/or cellulose esters.

12. A coating composition as claimed in claim 10, comprising as customary paint binders water-dilutable, anionically stabilized resins.

13. An ink or surface coating comprising the pigment as claimed in claim 9.

14. An emulsion paint comprising the pigment as claimed in claim 9.

15. A method comprising applying the coating composition as claimed in claim 10 on a commodity article.

16. A method comprising painting a vehicle with the coating composition as claimed in claim 10.

17. A vehicle coated with a coating composition as claimed in claim 10.

* * * * *